(12) United States Patent
Davies

(10) Patent No.: US 10,721,284 B2
(45) Date of Patent: Jul. 21, 2020

(54) ENCODING AND DECODING OF LIVE-STREAMED VIDEO USING COMMON VIDEO DATA SHARED BETWEEN A TRANSMITTER AND A RECEIVER

(71) Applicant: Cisco Technology, Inc., San Jose, CA (US)

(72) Inventor: Thomas Davies, Guildford (GB)

(73) Assignee: Cisco Technology, Inc., San Jose, CA (US)

( * ) Notice: Subject to any disclaimer, the term of this patent is extended or adjusted under 35 U.S.C. 154(b) by 439 days.

(21) Appl. No.: 15/466,169

(22) Filed: Mar. 22, 2017

(65) Prior Publication Data

US 2018/0278669 A1 Sep. 27, 2018

(51) Int. Cl.
*H04N 7/16* (2011.01)
*H04L 29/06* (2006.01)

(52) U.S. Cl.
CPC .......... *H04L 65/607* (2013.01); *H04L 65/403* (2013.01); *H04L 65/601* (2013.01); *H04L 65/602* (2013.01); *H04L 65/604* (2013.01)

(58) Field of Classification Search
CPC ... H04L 65/403; H04L 65/602; H04L 65/607; H04L 65/60; H04L 65/601; H04L 65/603; H04L 65/605; H04L 65/604; G06F 3/1454; G11B 27/031
See application file for complete search history.

(56) References Cited

U.S. PATENT DOCUMENTS

| | | | |
|---|---|---|---|
| 6,728,753 B1 * | 4/2004 | Parasnis | G06Q 10/109 709/203 |
| 8,140,701 B2 | 3/2012 | Rajan | |
| 9,055,192 B1 | 6/2015 | Mallappa et al. | |
| 9,479,735 B2 | 10/2016 | Willig et al. | |
| 2008/0005233 A1 | 1/2008 | Cai et al. | |

(Continued)

OTHER PUBLICATIONS

Article, "IMCA Ups the Ante on Conference Delivery Strategy", Dec. 22, 2016, http://www.prweb.com/releases/2016/02/prweb13220724.htm, 2 pages.

(Continued)

*Primary Examiner* — Chirag R Patel
*Assistant Examiner* — Rachel J Hackenberg
(74) *Attorney, Agent, or Firm* — Edell, Shapiro, & Finnan, LLC

(57) ABSTRACT

A first endpoint device has access to common video data including common video frames and encoded common video data having the common video frames encoded therein. The encoded common video data is downloaded to a second endpoint device. After, or during, the downloading of the encoded common video data, live video frames are played in a play order. The live video frames are encoded in the play order into encoded live video frames. To encode the live video frames, each live video frame is predicted based on a previous live video frame that has been encoded and a common video frame from the common video data that has been downloaded in the encoded common video data. The encoded live video frames include indications of the previous live video frame and the common video frame used to encode each encoded live video frame are transmitted to the second endpoint device.

20 Claims, 12 Drawing Sheets

(56) References Cited

U.S. PATENT DOCUMENTS

2008/0010382 A1* 1/2008 Ratakonda .......... H04L 65/4092
709/231
2014/0376609 A1* 12/2014 Barkley ................ H04N 7/147
375/240.02
2017/0134727 A1* 5/2017 Amon ...................... H04N 7/15

OTHER PUBLICATIONS

I. Unanue, et al., "A Tutorial on H.264/SVC Scalable Video Coding and its Tradeoff between Quality, Coding Efficiency and Performance", www.intechopen.com, Recent Advances on Video Coding, Jul. 13, 2011, 25 pages.

H. Schwarz, et al., "Overview of the Scalable Video Coding Extension of the H.264/AVC Standard", IEEE Transactions on Circuits and Systems for Video Technology, vol. 17, No. 9, Sep. 2007, 18 pages.

* cited by examiner

ENCODING AND DECODING OF LIVE-STREAMED VIDEO USING COMMON VIDEO DATA SHARED BETWEEN A TRANSMITTER AND A RECEIVER

TECHNICAL FIELD

The present disclosure relates to encoding and decoding video.

BACKGROUND

In a multimedia collaboration environment, a presenter at a local endpoint device may share screen content associated with a presentation with one or more participating endpoint devices connected with the presenter endpoint device over a network; however, distributing high quality, low-latency video presentations under control of the presenter can cause complications. Content, such as slides in a PowerPoint presentation, is typically encoded in a similar way to live main video content, with low delay and no look-ahead, which limits image/video compression performance and video quality. In particular, animations and slide transitions are difficult to encode, and can cause either dropped video frames or a quality "crash" during the presentation. It is possible to distribute slides in advance, in compressed or uncompressed form, but this prevents the presenter from controlling the presentation.

DESCRIPTION OF EXAMPLE EMBODIMENTS

Overview

Figure 1:
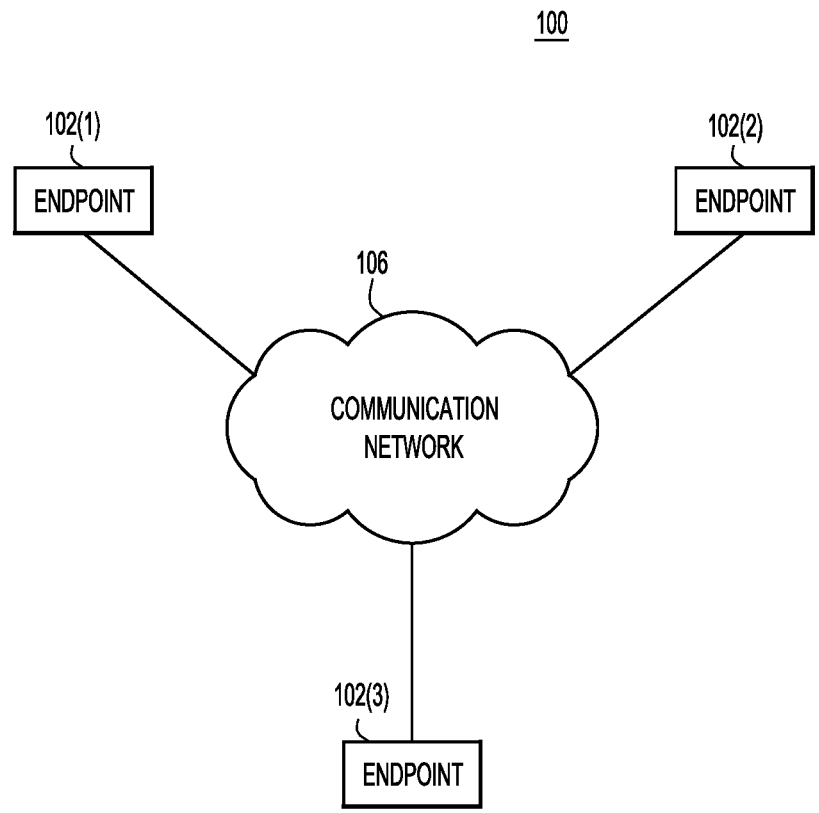
FIG. 1 is a block diagram of a video collaboration environment that supports encoding and decoding of live-streamed video using common video data shared between a video transmitter and a video receiver (both referred to more generally as "endpoint devices"), according to an example embodiment.

A first endpoint device has access to common video data including common video frames and to encoded common video data having the common video frames encoded therein. The encoded common video data is downloaded to a second endpoint device. After, or during, the downloading of the encoded common video data to the second endpoint device, live video frames are played in a play order. The live video frames are encoded in the play order into encoded live video frames. To encode the live video frames, each live video frame is predicted based on a previous live video frame that has been encoded and a common video frame from the common video data that has been downloaded in the encoded common video data. The encoded live video frames include indications of the previous live video frame and the common video frame used to encode each encoded live video frame are transmitted to the second endpoint device.

Example Embodiments

Embodiments presented herein are directed to collaboration sessions during which a presenter provides, and makes joint use of, hybrid content, including 1) a file-based video representation of a presentation (referred to as "common video data") that is reliably downloaded to participants at a start of a collaboration session, and 2) a low-delay video content share representing the video presentation that is played by the presenter and live-streamed to the participants, such that the live-streamed video (also referred to as "live-streamed video data") can make use of the previously downloaded common video data to reduce a bit-rate of the live-streamed video and dramatically improve quality. In an example, the presentation may be a PowerPoint slide show, and the common video data may be generated directly from the slide show using a PowerPoint-to-video-file converter tool.

The live-streamed video uses common video frames in the common video data as prediction reference frames. Any common video frame in the common video data may be used as a prediction reference frame and, unlike conventional scalable video applications, there is no assumption that the live-streamed video and the common video data are synchronized in any way; the common video data represents a "bucket" of potential prediction reference frames. Thus, the endpoint device of the presenter encodes the live-streamed video using the common video data for prediction reference frames, and the endpoint devices of the participants decode the live-streamed video using the same common video data that was used for the prediction reference frames.

In one form, the live-streamed video may simply be a set of video frame indices, delivered in a live-streaming format, that indicate which of the common video frames in the common video data are to be displayed, in what order, and at what time the common video frames are to be displayed. In a case where the presentation varies (e.g., because the presenter moves a pointer over a video frame or highlights some text on a slide during the live presentation, or if the common video data represents an older version of the presentation), or if there is additional bit-rate available for live-streaming, more data/information in addition to video frame indices may be live-streamed to participants to produce a higher quality presentation or provide a higher spatial resolution for the live-streamed video.

The embodiments presented herein address the problem that while live-streamed video often only requires a low transmission bit-rate on average, it may need a much higher transmission bit-rate for short intervals, e.g., during slide transitions or animations. The embodiments take advantage of, or benefit from, the prior delivery to the participants of the common video data in order to reduce these short-term peaks in bit-rate requirements.

In an example implementation, the presenter initiates a pre-load operation, which begins downloading or pushing the common video data to the participants. The common video data may be encoded in independent segments or chunks to allow a receiving endpoint device (i.e. a receiver) to access the presentation at an arbitrary point. This approach may be used in adaptive bit-rate streaming (ABR). Each encoded segment of common video data is independently decodeable without reference to other encoded segments. Access points in the live video stream can then be inserted at a given frame by enforcing that live video is only predicted from live video frames subsequent to that live video frame and/or from common video frames in common video data chunks known to have been received by all participants. The presenter can begin to play, and thus live-stream, the presentation before the common video data has been downloaded fully, which may cause only a small delay in decoding of the presentation for the participants at the start of the presentation. During a pause in the presentation, downloading of the common video data may be completed, such that the full download should occur within a much shorter time period than is required to give/play the presentation.

During the presentation, the endpoint device of the presenter (the transmitting endpoint device) intercepts/examines the played video frames and, for each of the played video frames, identifies/selects which common video frame(s) in the downloaded common video data may best be used as prediction reference frames with which to encode the played video frame. To do this, the endpoint device may keep track of timing of events in the (actual) presentation with respect to those events in the common video data. Such tracking may be achieved with knowledge of the content in the common video data that is played during the presentation (e.g., the content and numbering of individual slides in a PowerPoint), or by correlating video content between the played video frames and the common video frames in the common video data.

The embodiments presented herein also permit a new participant to join a collaboration session while the presenter endpoint device is live-streaming the video to existing participants. In that situation, metadata conveyed in/associated with the live-streamed video includes information to identify which chunk of the common video data should be delivered to the new participant. Upon joining, the new participant immediately buffers chunks of the common video data downloaded at a current point in the live-streamed video, and then buffers the remaining chunks of the common video data as they are subsequently downloaded. The transmitter inserts an access point as previously described into the live video stream so that in addition no reference is required to live video frames prior to that point, and access to previously downloaded chunks and subsequent live video frames is sufficient for successful decoding. Whenever reference is made by the live-streamed video to a chunk of the common video data that is not yet available to the new participant, delivery of that chunk can be prioritized. The presenter may also send to the new participant a list of chunks of common video data already accessed, such that the new participant may prioritize the download of chunks not yet accessed. The presenter may be aware of whether all participants have received the relevant chunks of the common video data and may adjust encoding strategy accordingly.

The regular insertion of access points also supports error resilience, in that if data from the live video stream is lost or imperfectly received, subsequent frames in the live video stream may still be recovered after a new access point.

Further features of the embodiments presented herein are described below in connection with FIGS. 1-12.

With reference to FIG. 1, there is depicted a high-level block diagram of a multimedia collaboration (e.g., video conference) environment 100 in which encoding and decoding of live-streamed video data using common video data shared between a transmitter endpoint device and a receiver endpoint device may be implemented. Collaboration environment 100 includes collaboration endpoint devices 102(1)-102(3) (collectively referred to as "endpoints 102," and individually referred to as an "endpoint") each connected to, or able to connect to, a communication network 106, which may include one or more wide area networks (WANs), such as the Internet, one or more local area networks (LANs), and one or more cellular networks. Collaboration environment 100 may also include a conference server (not shown in FIG. 1), connected with communication network 106, that facilitates establishing, maintaining, and terminating collaboration sessions between endpoints 102, as is known. Under operation of local users/participants (not shown), endpoints 102 establish audio-visual collaboration sessions with each other over communication network 106. Endpoints 102 may be wired or wireless communication devices, such as, but not limited to laptop and tablet computers, smartphones, video conference devices, and the like.

Figure 2:
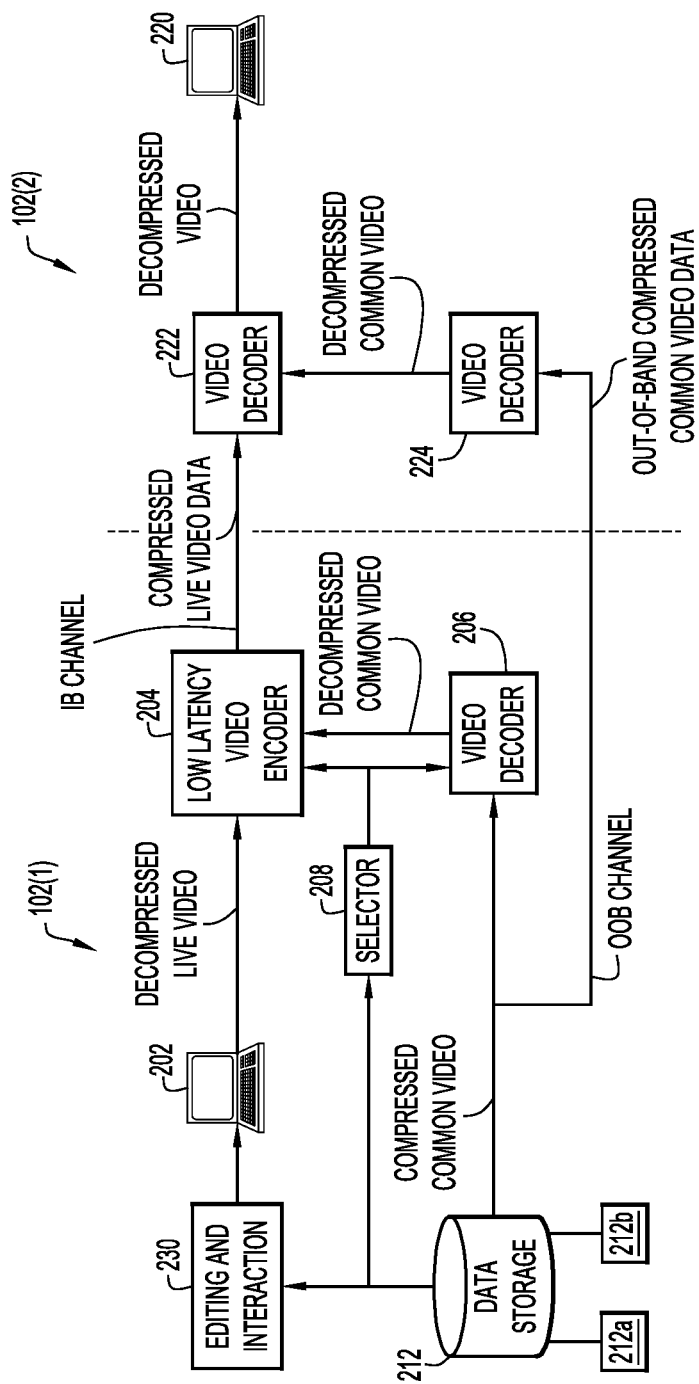
FIG. 2 is a high-level functional block diagram of content sharing between the video transmitter and the video receiver during a collaboration session, according to an example embodiment.

With reference to FIG. 2, there is shown a high-level functional diagram of an example of hybrid content delivery, including video content sharing between endpoint 102(1) and endpoint 102(2), during a collaboration session, in accordance with techniques presented herein. In the example of FIG. 2, endpoint 102(1) (referred to as "video transmitter 102(1)") shares video content with endpoint 102(2) (referred to as "video receiver 102(2)") over network 106. As depicted in FIG. 2, Video transmitter 102(1) includes a display and user interface 202, a low-latency/real-time encoder 204, a video decoder 206, and a selector 208, which may be integrated with the encoder. Video transmitter 102(1) has access to a data store 212, which may be local to the video transmitter, or remote from the video transmitter. Video receiver 102(2) includes a display and user interface 220, a first video decoder 222, and a second video decoder 224. Low-latency video encoder 204 and video decoder 222 may implement known or hereafter developed coding/decoding techniques, extended to use shared common video data in accordance with the techniques presented herein. Such coding/encoding techniques may generally follow any of the Moving Picture Experts Group (MPEG) standards, the H.264/Advance Video Coding (AVC) standard, the H.265/High Efficiency Video Encoding (HEVC) standard, the VP8 or VP9 compression systems, and so on. Similarly, video encoder 206 and video decoder 224 may also operate in accordance with any known or hereafter developed coding standard or technology.

Data store 212 stores both "common" video data 212a and encoded/compressed common video data 212b, which is an encoded version of the common video data. Common video data 212a and encoded common video data 2121b may be stored as separate files in data store 212. The term "common" indicates that common video data 212a is shared between video transmitter 102(1) and video receiver 102(2). In an example, common video data 212a includes a sequence of common video frames and unique identifiers of each of the common video frames. Encoded common video data 102b includes the sequence of common video frames in encoded/compressed form, i.e., a sequence of encoded common video frames, and also includes the unique identifiers to identify the common video frames encoded therein. The encoded common video frames typically include intra-encoded (i.e., intra-predicted) video frames and inter-encoded (i.e., inter-predicted) video frames. The encoded common video frames indicate their respective intra-frame and inter-frame prediction dependencies. Any known encoder may be used to generate encoded common video data 212b from common video data 212b. The terms encode/decode and their derivatives as used herein are synonymous with the terms compressed/decompressed and their derivatives. Also, the term "video frame" is construed broadly to also encompass an identifiable "video block," "video slice,", "video tile," "video data," and "video content."

In a non-limiting example, common video data 212a may be a video representation of a slide show, such as a PowerPoint presentation, including a sequence of numbered slides, including graphics, animation, and/or video clips at various points in the sequence of slides. Each of the slides may correspond to, or be represented by, one or more of the aforementioned common video frames of common video data 212a. Encoded common video 112b may be a compressed version of the slide show, such as an MPEG version of the slide show. The compressed version of the slide show may be generated as a video capture of/from the slide show using any known video exporting tool that compresses the slide show into an MPEG format, for example.

Sharing of content between video transmitter 102(1) (i.e., first endpoint 102(1)) and video decoder 102(2) (i.e., second endpoint 102(2)) in accordance with the techniques presented herein is now described with reference to FIGS. 3 and 4, and with continued reference to FIG. 2. The ensuing description may refer to the above-mentioned slide show as the shared content by way of example only, and it is understood that any other form of video content may be shared in accordance with the techniques presented herein.

Figure 3:
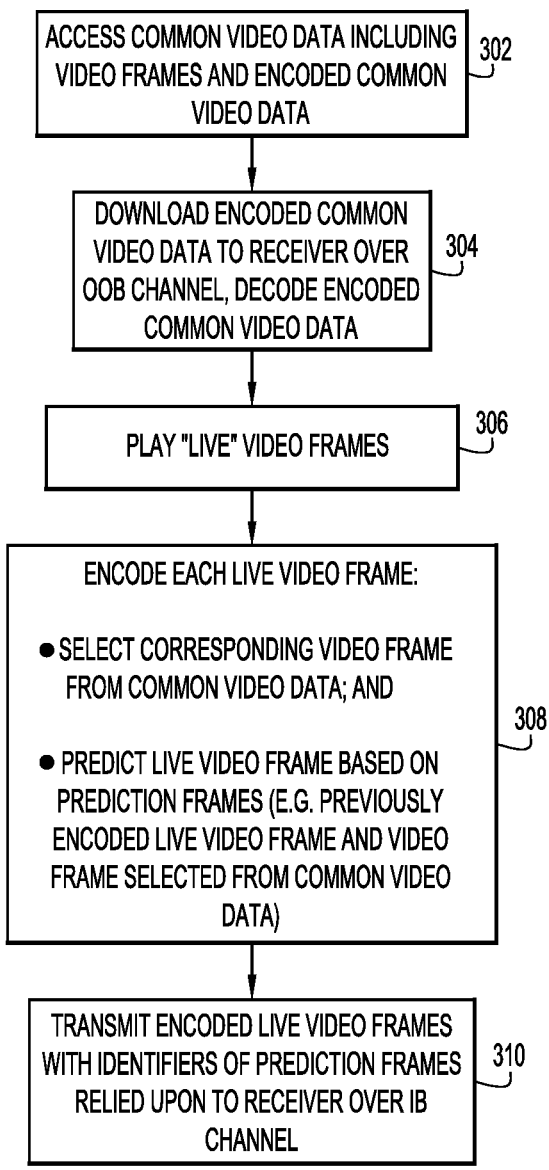
FIG. 3 shows operations for encoding live video data using shared common video data performed by the video transmitter, according to an example embodiment.

With reference to FIG. 3, there are shown example operations 300 for encoding live video data using shared common video data performed by video transmitter 101(2).

At 302, video transmitter 102(1) accesses common video data 212a from data store 212. Video transmitter 102(1) also accesses content for playback on the display of display and user interface 202. The content may include content in common video data 212a, or content from another source of video content that is similar to or the same as portions of the common video data. Video transmitter 102(1) also accesses encoded video data 212b from data store 212.

At 304, video transmitter 102(1) establishes a first connection or channel (e.g., an "out-of-band (OOB)" connection or channel) with video receiver 102(2), and then downloads (i.e., sends/transmits) to the video receiver encoded common video data 212b over the OOB channel and, throughout the download process, keeps track of which portions of the encoded common video data have been downloaded to the video receiver, and which portions have not been downloaded to the video receiver. The OOB channel may use a protocol with in-built reliable delivery such as the Transmission Control Protocol (TCP) to download encoded common video data 212b. Alternatively it may use an unreliable delivery mechanism such as User Datagram Protocol (UDP) with additional methods such as retransmission or Forward Error Correction to ensure reliable delivery or increase its likelihood.

In addition, video transmitter 102(1) provides encoded common video data 212b to video decoder 206. Video decoder 206 decodes encoded common video data 202b, based on the intra-frame and the inter-frame prediction dependencies indicated therein, to reconstruct the common video frames of common video data 212a as identified by the unique identifiers. That is, video decoder 206 recovers common video data 212a from encoded common video data 212b. Video decoder 206 will provide (reconstructed) common video data 212a to low-latency video encoder 204 under control of selector 208, as described below in connection with operation 308.

At 306, under control of a user/operator via display and user interface 202 (represented as "editing and interaction" operations 230 in FIG. 2), video transmitter 102(1) plays the content accessed at 302 in a play order. This results in delivery of a stream of "live" or "real-time" video frames in the play order to low-latency video encoder 204. Typically, the live video frames correspond closely, but not always exactly, with common video data 212a. For example, the live video frames may represent a real-time playout of some or all of common video data 212a, or another source of similar video data, on the display in a play order. The play order may be the same as, or different from, an order of the content in common video data 212a. Using the slide show example, the user/presenter may step through (i.e., play) the slides of the slide show in sequence, may jump between various slides (i.e., step through the slides out of sequence), edit any given slide, play animation or video clips on a given slide, pause on a given slide, and so on. Each played or "live" slide results in the delivery of one or more corresponding live video frames representing that slide to low-latency video encoder 204. Pausing on a given slide may result in delivery of live video frames that are essentially repeats of each other, while common video data 212a may be generated without such repeats. For the techniques presented herein to be successful, it is not necessary for common video data 212(a) to be exactly the same as the played content. Rather, it is sufficient that common video data 212a provides a good representation of, i.e., is substantially similar to, at least portions of the played content.

For encoding purposes, presentation data (e.g. slides) played to the display may be sampled at a greatly reduced video frame rate, such as 5 video frames per second (fps), with respect to the native video display rate of the display, which is typically between 50-100 fps. Typically, the resulting "live" video frames are encoded in near real-time at the reduced video frame rate. Often, video encoding settings are chosen so that each live video frame remains sharp. A conventional low-latency video encoder operates in near real-time to predict each live video frame with reference to previous live video frames that are substantially similar to the live video frame to minimize the amount of resulting prediction data to be transmitted to a video decoder over a video streaming channel.

If the live video frame is substantially different from the previous live video frame, e.g., when a slide show transitions between different slides, the live video frame cannot be predicted efficiently from the substantially different previous live video frame, which results in a sudden large increase in the amount of prediction data relative to when the live video frame and the previous live video frame are similar to each other, especially when the sharp video settings are maintained across the different live video frames. In that case, the streaming channel may not have a sufficiently high maximum transmission bit-rate to transmit to the video decoder in a timely manner both the suddenly increased amount of prediction data and all of the encoded live video frames, which results in some of the encoded live video frames being dropped to avoid exceeding the maximum transmission bit-rate.

To overcome the aforementioned problem, embodiments presented herein extend the operations of low-latency video encoder 204 and video decoder 222 so as to have access to and use common video data 212a previously transmitted to the video decoder. Video encoder 204 and video decoder 222 use the common video data to furnish a set of encoder/decoder predictions for use in real-time encoding (and then decoding) of the live video frames. Such use of the encoder/decoder predictions in this way advantageously reduces the bit-rate required to transmit the encoded live video frames. More specifically, low-latency video encoder 204 (and video decoder 222) normally predict each live video frame with reference both to previous live video frames and with reference to common video data 212a shared between the low-latency video encoder and the video decoder so as to avoid any sudden increase in prediction data that may otherwise occur without the use of the common data, as will be described below.

At 308, low-latency video encoder 204 encodes the live video frames delivered thereto in the play order into encoded live video frames, while also taking advantage of the full set of common video frames of common video data 212a previously made available to the low-latency video encoder via video decoder 206, and downloaded to video receiver 102(2). To do this, for each live video frame (i.e., each played video frame) delivered to low-latency video encoder 204, selector 208 (i) searches for and selects a corresponding common video frame from common video data 212a as provided from video decoder 206 that has already been downloaded to video receiver 102(2) in encoded form via the 00B channel, and (ii) indicates the selected common video frame to video encoder 204, e.g., via the identifier of the selected common video frame. Then, video encoder 204 predicts the live video frame with reference to/based on prediction frames or dependencies that include (i) a previous live video frame (i.e., a previously encoded live video frame), and (ii) the selected common video frame, to produce a corresponding encoded live video frame. In some circumstances it may be advantageous to encode a given live video frame based on multiple previous live video frames and/or multiple common video frames selected from common video data 212a. It is understood that it is unnecessary to reduce the video frame rate for live-streaming of content, since the bit-rate required for each frame is likely to be much smaller, and indeed it may be possible to increase it greatly.

Typically, selector 208 searches for and selects a common video frame/multiple common video frames from common video data 212a based on a frame selection criterion so that predicting the live video frame using the selected common video frame(s) will result in reduced prediction residuals/differences compared to predicting without using the selected common video frame(s), e.g., using only previous live video frames. The frame selection criterion may be based on similarity, e.g., that the common video frame(s) is/are to be the same as the live video frame to be encoded, or similar to the live video frame to be encoded within some similarity tolerance range. In the slide show example in which slides are identified numerically, and the live video frames and the common video frames of common video data 212a are correspondingly identified, selector 208 selects a common video frame from the common video data so that the selected common video frame is associated with the same slide number as the slide from which the live video frame is being played (or so that the selected common video frame and the live video frame have matching identifiers). This results in selection of common video frames that are likely to be the same as or similar to the live video frame. In another example, using any known or hereafter developed image/video comparing technique, selector 208 searches through common video data 212a for a common video frame having video content most similar to (i.e., the least amount of difference from) the video content of the live video frame within a predetermined difference criterion associated with the searching, and selects that common video frame. In other words, selector 208 compares the video content of the live video frame to the video content of each of the common video frames in common video data 212a and, based on results of the compare, selects the common video frame from the common video data that is most similar to the live video frame. In yet another example, the live video frames and the common video frames of common video data 212a may be time stamped with sequentially increasing time stamp values, and selector 208 selects the common video frame of common video data 212a such that the selected common video frame and the live video frame have matching time stamps, and thus similar video content.

At 310, video transmitter 102(1) establishes a second connection or channel (e.g., an "in-band (IB)" channel or connection) with video receiver 102(2). Video transmitter 102(1) transmits to video receiver 102(2) over the D3 channel encoded video data, including (i) the encoded live video frames, and (ii) indications of prediction dependencies, including, but not limited to, identifiers of the previous live video frame and the selected common video frame of common video data used to predict each live video frame. The identifiers may be embedded in the encoded video data, i.e., the encoded video data includes the identifiers. Each identifier may be flagged to indicate whether the identifier relates to a previous live video frame, or a common video frame. That is, the identifiers include information to distinguish between identifiers of previous live video frames and the common video frames. The process of transmitting the encoded video data is also referred to as "live-streaming the encoded live video frames," and the encoded live video frames may be referred to as "live-streamed video content" or "live-streamed video data." In an example, the D3 channel may carry the live-streamed video content based on a streaming protocol, such as the User Datagram Protocol (UDP).

In an example, the above-mentioned encoded video data that is transmitted to video receiver 102(2) includes (i) metadata, formatted in accordance with a metadata syntax, that describes the encoding operations, e.g., inter-prediction/intra-prediction, identifies prediction dependencies (e.g., the aforementioned identifiers to both previous live video frames and the common video frames), and provides encoding parameters, and (ii) coefficient data describing difference residuals (i.e., difference signals) between current video frame data, previously transmitted video frame data, and common video data, that results from the encoding operations described in the metadata.

In the embodiment described above, the first and second channels are different OOB and D3 channels. The term OOB channel generally refers to a back or indirect channel with respect to an D3 channel, but the second channel described above need not be such a back or indirect channel. Moreover, in other embodiments, the first and second channels may actually be the same channel that is active during a first time period to convey encoded common video data 212b, and active during a second time period to convey the live-streamed content, where the first and second time periods may overlap or be mutually exclusive.

Figure 4:
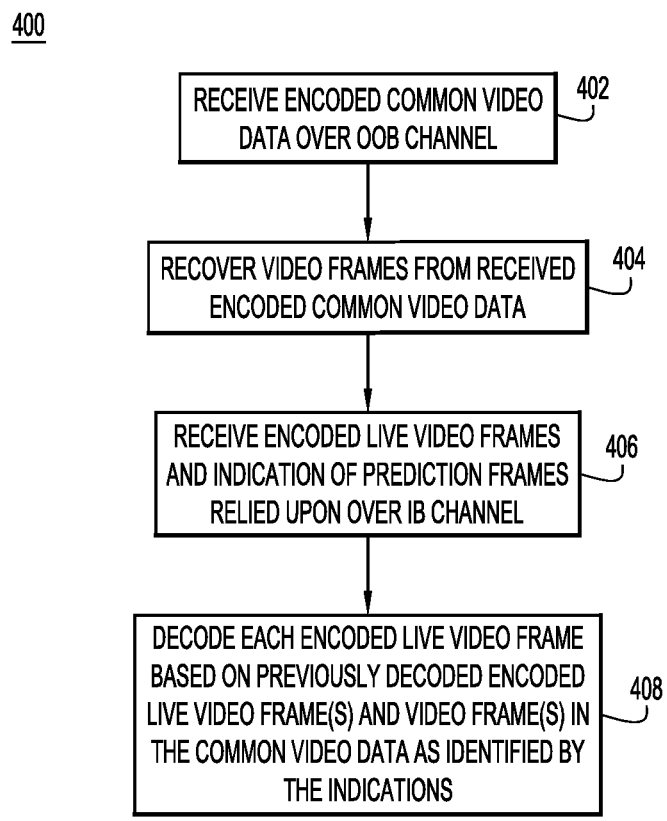
FIG. 4 shows operations for decoding encoded live video using the shared common video data performed by the video receiver, according to an example embodiment.

With reference to FIG. 4, there are shown example operations 400 for decoding live-streamed video content using shared common video data performed by video receiver 102(2).

At 402, video receiver 102(2) establishes the OOB channel with video transmitter 102(1), and receives encoded common video data 212b downloaded from the video transmitter over the OOB channel (from operation 304, above).

At 404, video decoder 224 of video receiver 102(2) decodes downloaded encoded common video data 212b, based on the intra-frame and the inter-frame prediction dependencies indicated therein, to reconstruct the sequence of common video frames of common video data 212a, which includes the unique identifiers of the common video frames. That is, video decoder 224 recovers common video data 212a from downloaded encoded common video data 212b. Video decoder 224 provides (reconstructed) common video data 212a to video decoder 222.

At 406, video receiver 102(2) establishes the D3 channel with video receiver 102(1), and receives over the D3 channel the encoded live video frames and indications of the prediction frames relied upon to encode the encoded live video frames.

At 408, video decoder 222 decodes each received encoded live video frame based on previously decoded ones of the received encoded live video frame(s) and the common video frame(s) in common video data 212a (as provided via video decoder 224) as identified by the indications of the prediction dependencies in the encoded live video frames.

Figure 5:
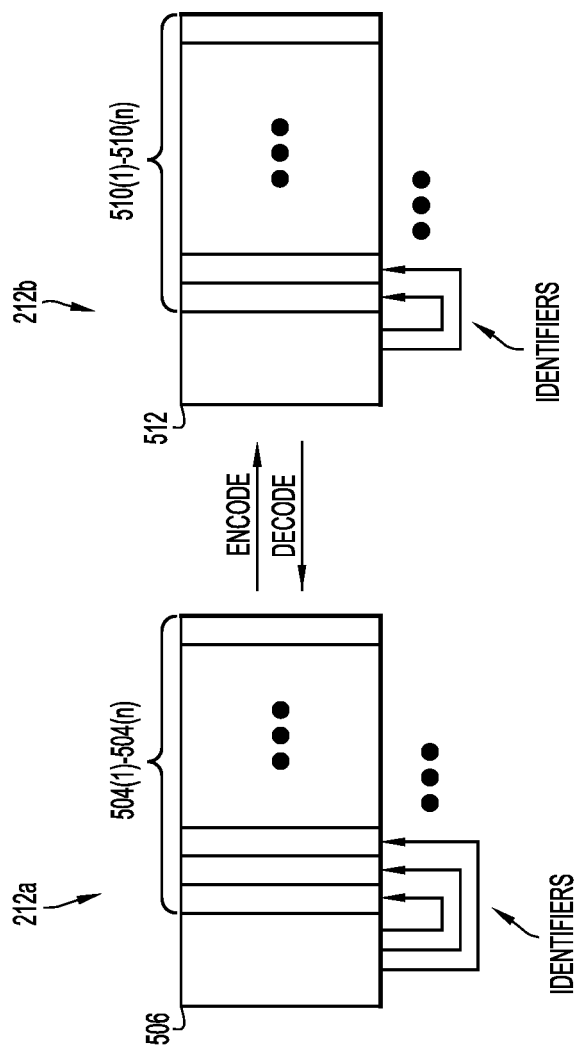
FIG. 5 is an illustration of common video data and encoded common video data, according to an example embodiment.

With reference to FIG. 5, there is an illustration of common video data 212a and encoded common video data 212b. Common video data 212a includes a sequence of common video frames 504(1)-504(N), and a header 506 including unique identifiers or indexes (e.g., 1–N) identifying respective ones of each of the common video frames. Encoded common video data 212b includes a sequence of encoded common video frames 510(1)-510(N) corresponding to encoded versions of respective ones of common video frames 504(1)-504(N), and a header 512 including the unique identifiers or indexes identifying respective ones of the encoded common video frames (or common video frames encoded therein). Encoded common video frames 510(1)-510(N) also indicate their respective intra-prediction and inter-prediction dependencies. The prediction dependencies used to encode encoded common video data 212b and indicated therein are entirely independent of and separate from the prediction dependencies used by low-latency encoder 204 to encode the live video frames, including the identifiers of the previous live-video frames and the common video frames used to encode the live video frames.

Figure 6:
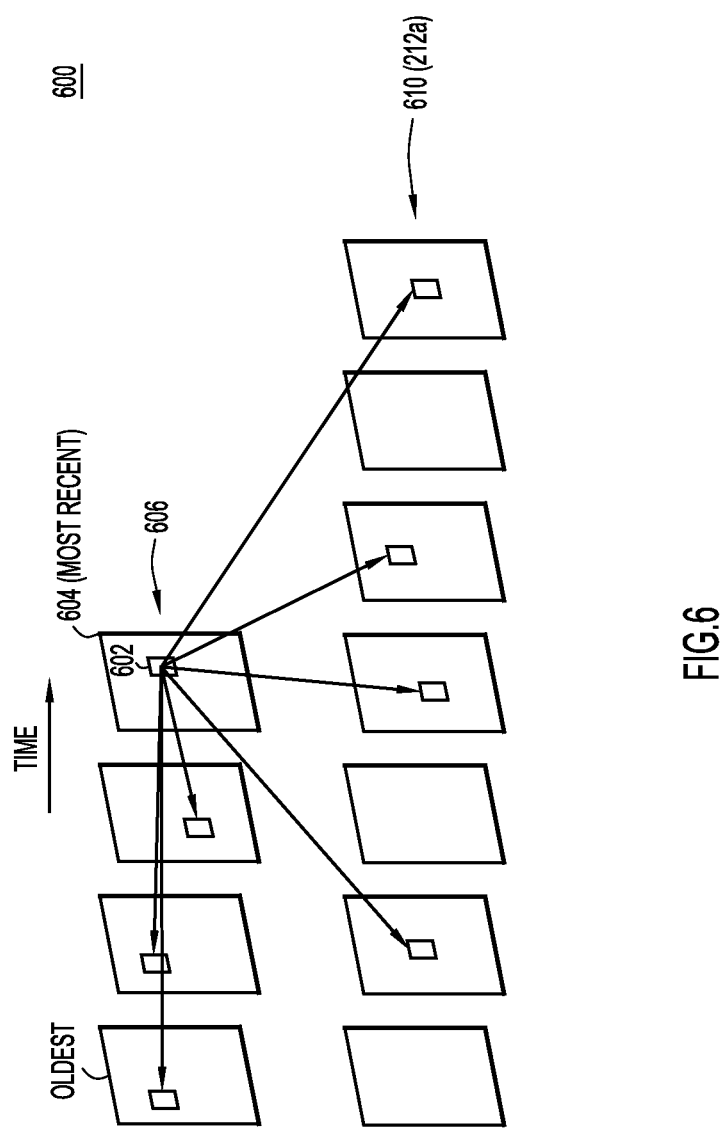
FIG. 6 is an illustration of an encode operation performed by an encoder of the video transmitter, according to an example embodiment.

With reference to FIG. 6, there is an illustration of an example encode operation 600 performed by low-latency video encoder 204 showing prediction dependencies used in the encode operation. In the example of FIG. 6, video encoder 204 predicts a content block 602 of a current (i.e., most recent) live video frame 604 that is part of a sequence of live video frames 606 based on (i.e., with reference to) corresponding content blocks from other video frames, referred to as "reference frames." Prediction dependencies are shown as arrows pointing from content block 602 to corresponding content blocks in respective ones of the reference frames used to predict content block 602. In the example of FIG. 6, content block 602 is predicted with reference to (i.e., with prediction dependencies on) multiple reference frames, including (i) each of the previous live video frames in the same live sequence 606, and (ii) corresponding content blocks in several common video frames in a sequence of common video frames 610 of common video data 212a that have already been downloaded to video receiver 102(2). Common video data 212a may include content from video frames that have not yet been played, i.e. content from the future with respect to (played) live video frames. Prediction dependencies between live video frames 606 and common video frames 610 may be referred to as inter-layer prediction dependencies. Encode operation 600 generates an encoded live video frame to be transmitted video receiver 102(2) along with identifiers/indexes of each of the reference frames used to encode the encoded live video frame, as described above.

In an embodiment, common video data 212a may include a sequence of video chunks, e.g., as in Video on Demand (VOD) applications. In such "chunked" video data, each video chunk includes variously-sized video frame data and, when encoded, may be decoded without reference to any other encoded video chunks because prediction dependencies in a given chunk are constrained to that chunk. Normally the first video frame in an encoded video chunk is an intra-frame (i.e., coded without reference to any other frames). In VOD applications, the video chunks are typically 2-5 seconds in length and are sent in time order. Frames within a chunk are often heavily reordered with respect to temporal order, although they must obey the conventions of the video compression standard used to encode them—i.e., video frame data and reconstruction processes still depend only on data previously transmitted in coded order. Video frame sizes can vary enormously within a video chunk, and also between video chunks, and so reordering and buffering can cause latencies several times the length of a chunk.

Each video chunk includes a set of video frames that fills that chunk, and begins with a header that includes the above-mentioned unique identifiers that identify respective ones of the video frames in the video chunk. In that case, encoded common video data 212b may be generated, and downloaded to video receiver 102(2), as a sequence of independently encoded video chunks corresponding to respective ones of the common video chunks, and to include the corresponding header identifiers to identify the common video frames encoded therein. Each encoded video chunk is encoded without reference to content from other chunks, so it is also independently decodable. Each encoded common video data chunk also identifies inter- and intra-prediction dependencies used to encode that chunk. An encode operation that predicts live frames based on reference frames from video chunks of common video data is illustrated in FIG. 7, described below.

Figure 7:
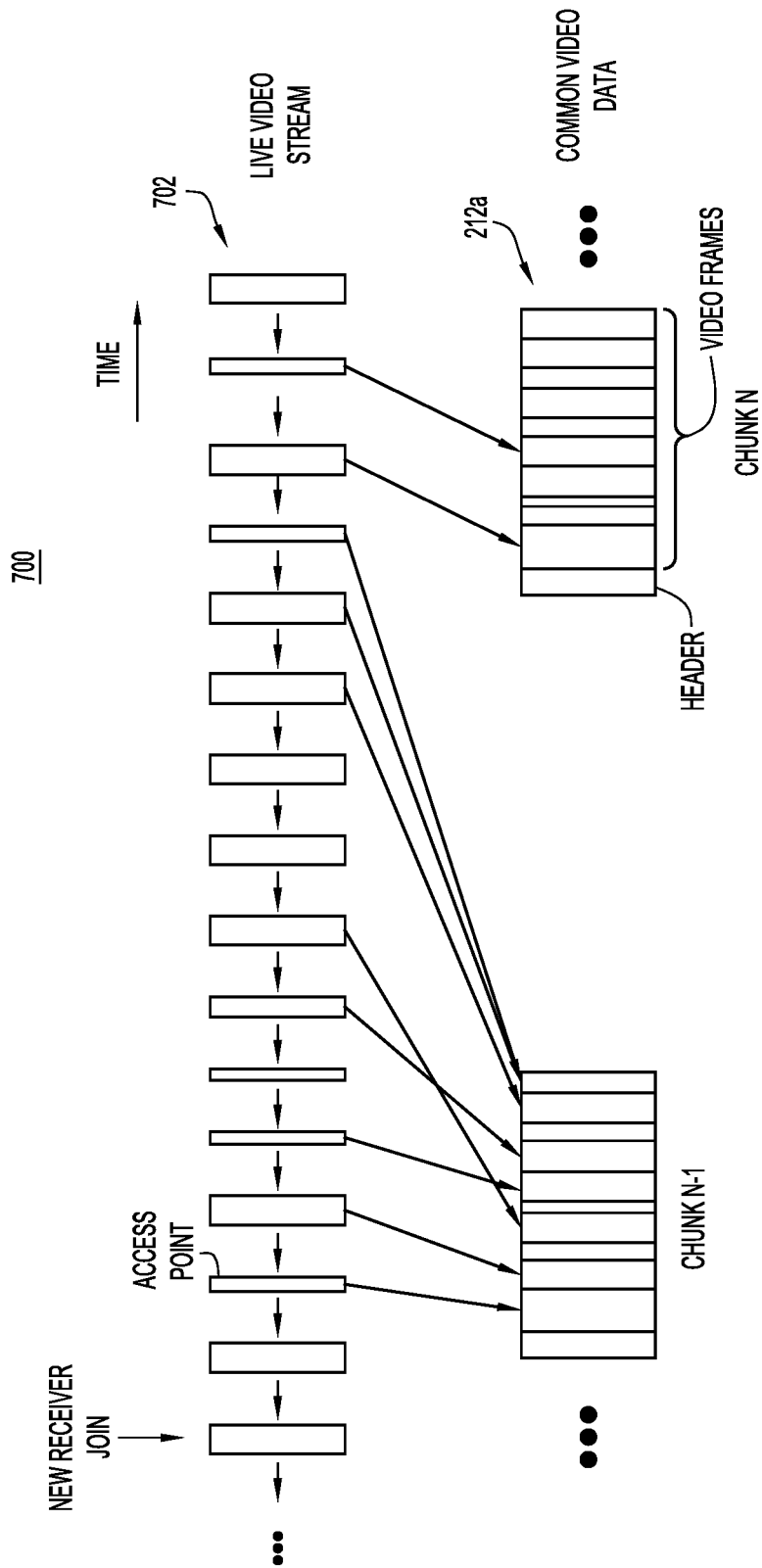
FIG. 7 is an illustration of an encode operation performed by the encoder that shows prediction dependences between live video frames and video frames of common video data, according to an example embodiment.

With reference to FIG. 7, there is an illustration an example encode operation 700 performed by video encoder 204 that shows prediction dependences (shown as arrows) between live video frames in a live video stream 702 and common video frames of common video data 212a in the form of sequential video chunks N and N–1 that have already been downloaded to video receiver 102(2) in corresponding, independently encoded video chunks. Typically, encoded common video data 212b may be downloaded to video receiver 102(2) more quickly than content therein is live-streamed to the video receiver. For example, a user may take an hour to present/play a 30 slide presentation, but downloading a high quality version of the 30 slides as encoded common video data 212b, including animations, may take only minutes or even seconds at an average bit rate provided for an OOB channel, even if the OOB bit-rate is lower than that of the live video channel.

In the example of FIG. 7, low-latency video encoder 204 predicts each live video frame in stream 702 based on its preceding live video frame up to an access point and, in some cases, also on common video frames in one of video chunks N or N-1 of the common video data. The access point and associated "new receiver join" indicated in FIG. 7 will be described below in connection with FIGS. 8 and 9.

At any time during the collaboration session described above in connection with FIGS. 2-4, while video transmitter 102(1) live-streams video content to video receiver 102(2), a second video receiver may join the collaboration session to also receive the live-streamed content "mid-stream." A conference server (not shown in FIG. 1) may facilitate joining of the second video receiver to the collaboration session. Typically, encoded live video frames in the live-streamed content depend on previous live video frames, but may also depend on common video frames from chunks of common video data 212a. When the second video receiver joins live-streamed content, the second receiver needs to start decoding the content from a point that has no prior prediction dependencies. To achieve this, contemporaneous with the time of the join, video encoder 204 inserts into the live-streamed content an "access point" (described further below) at which the live-streamed content depends only on common video frames (e.g., chunks) in common video data 212a, and is therefore decodable by the second receiver, and such that subsequent live-streamed content does not refer to live-streamed content prior to that point. Advantageously, each chunk of encoded common data 212b is independently decodable, so it can be assumed that once a given chunk of the encoded common data has been downloaded to the second receiver, the corresponding chunk of common video data 212a is more-or-less immediately available to the second receiver.

Access points do not need to correspond specifically to chunks in common video data 212a. Rather, the access point is inserted when a new video receiver joins, or when one of the previously joined video receivers loses synchronization due to transmission losses or other reasons. In addition, they may be inserted at regular intervals to simplify signalling for these applications. Use of video chunks (i.e., "chunking") is an effective way to deliver common video data 212a because it avoids the need to download common video data 212a in its entirety when the second receiver joins before the second receiver can begin to decode the currently live-streamed content: with chunking, the second video receiver only has to decode the chunks on which the live-streamed content depends at the time of the join.

Figure 8:
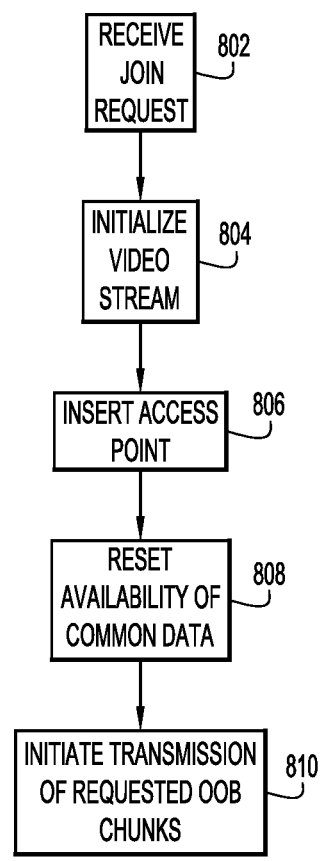
FIG. 8 shows operations performed by the video transmitter to join a second video receiver to an existing collaboration session, and then stream encoded video data to the second video receiver, according to an example embodiment.
Figure 9:
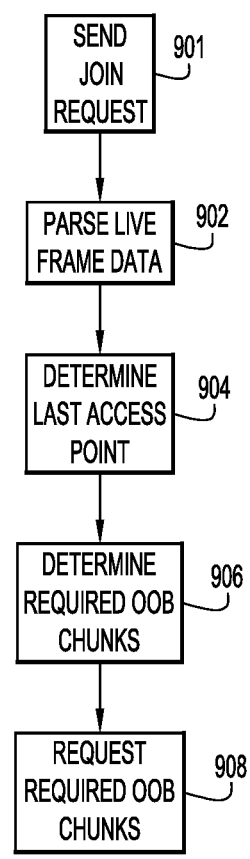
FIG. 9 shows operations performed by the video receiver to join the existing collaboration session, according to an example embodiment.

The process of joining the second video receiver to the collaboration session "mid-stream" is now described in further detail from the perspectives of video transmitter 102(1) and the second video receiver, in connection with FIGS. 8 and 9, respectively.

With reference to FIG. 8, there are shown operations 800 performed by video transmitter 102(1) to join to the existing collaboration session the second video receiver, e.g., video receiver 102(3) (i.e., third endpoint 102(3)) from FIG. 1, and then stream the encoded video content to the second video receiver.

At 802, video transmitter 102(1) receives from second video receiver 102(3) a request to join the collaboration session already in-progress between the video transmitter and video receiver 102(2). The request is essentially a request by video receiver 102(3) to also receive the encoded live video frames being transmitted to video receiver 102(2). Receipt of the request triggers next operations 804-810.

At 804, video transmitter 102(1) establishes an D3 connection with video receiver 102(3) over which subsequently encoded live vide frames may be transmitted to video receiver 102(3). This is referred to as "initializing the video stream."

At 806, video transmitter 102(1) identifies a "current" live video frame, contemporaneous with the receipt of the request, which is to serve as a basis of a decoding access point (referred to simply as an "access point") in the stream of encoded live video frames. The access point is the point at which video encoder 204 predicts the identified current live video frame and all subsequent live video frames without reference to any previous live video frames, i.e., without reference to live video frames previous to the identified current live video frame that will serve as the access point. In other words, video encoder 204 breaks prediction dependencies to the previous live video frames that occur before the access point so that, after the access point, the encoded live video frames may be decoded without reference to those previous live video frames. The access point may be represented as the identified current live video frame, the identified current live video frame in encoded form, or a time coinciding with either of the above.

Video transmitter 102(1) inserts the access point into the encoded live video frames beginning with the identified current live video frame. That is, video encoder 204 predicts the identified current live video frame and subsequent live video frames without reference to any live video frames previous to the identified current live video frame. Video encoder 204 may predict each of the subsequent live video frames with reference to one or more previous live video frames that occur at, or after, the access point. Video encoder 204 may also predict the identified current live video frame and the subsequent live video frames based on common video frames as described above, but this common video data needs to be made available to newly joined video receiver 102(3) with a minimal delay so that the joined video receiver will be able to decode from the access point onwards.

Accordingly, at 808, video transmitter 102(1) (e.g., selector 208, using techniques described above) locates (i) common video frames of common video data 212a with which to encode the identified current live video frame and/or the subsequent live video frames that are proximate the identified current live video frame in time, and (ii) the corresponding encoded common video frames in encoded common video data 212b. Video transmitter 102(1) then downloads to second video receiver 102(3) encoded common video data 212b over an 00B channel in a transmission order that begins with the located encoded common video frames in the encoded common video data. This ensures that video receiver 102(3) will receive the first needed common video frames of common video data 212a first in time. This process is referred to as "resetting availability of common data" in FIG. 8.

At 810, video transmitter 102(2) downloads subsequent chunks of encoded common video data 212b in response to requests for those chunks received from video receiver 102(3). This ensures the subsequent chunks are available at video receiver 102(3) for decoding of the live-streamed content received by the video receiver over the D3 channel.

With reference to FIG. 9, there are shown operations 900 performed by video receiver 102(3) to join the existing collaboration session and that correspond to operations 800 performed by video transmitter 102(1).

At 901, video receiver 102(3) sends to video transmitter 102(1) the request to join the collaboration session and then establishes the D3 channel with the video transmitter over which the encoded live video frames may be live-streamed to video receiver 102(3).

At 902, video receiver 102(3) begins receiving from video transmitter 102(1) the encoded live video frames. Video receiver 102(3) searches/parses the received encoded live video frames, using, e.g., the metadata therein, for the access point inserted by video transmitter 102(1).

At 904, video receiver 102(3) finds/determines the access point in the parsed encoded live video frames.

At 906, video receiver 102(3) identifies/determines which common video frames in common video data 212a were used to encode the access point, if any. If the identified common video frames have already been received over the 00B channel from video transmitter 102(1) in encoded form (as encoded common video data 212b) and decoded, video receiver 102(3) uses the common video frames to decode the received encoded live video frames.

Otherwise (i.e., the common video data is not available) at 908, video receiver 102(3):
  a. sends a requests to video transmitter 102(1) for the identified common video frames of common video data 212a;
  b. receives the requested content in encoded form (e.g., in a downloaded chunk of encoded common video data that includes the identified common video frames encoded therein);
  c. decodes (by video decoder 224) the content downloaded in encoded form; and
  d. uses the decoded content (i.e., the identified common video frames) to decode (by decoder 222) the received encoded live video frames.

Operation 908 is repeated over time to access common video data needed to decode encoded live video frames subsequently received over the D3 channel.

A summary of the above-described operations (900) for video receiver 102(3) to start decoding the live-streamed content is as follows. First, video receiver 102(3) finds an access point, which is likely to have been inserted by video transmitter 102(1) after negotiating with video receiver 102(3). Encoded live video frames after the access point contain identifiable prediction dependencies (references) to common video frames. Once these common video frames have been identified by video receiver 102(3), the video receiver requests from video transmitter 102(1) the relevant chunks of encoded common video data 212b that contain the identified common video frames, if the video transmitter has not already started transmitting those chunks to the video receiver. While waiting for the chunks, live-streamed encoded live video frames received at video receiver 102(3) can be buffered in the video receiver. When the video the chunks are received and decoded by video receiver 102(3), the buffered live-streamed content can be decoded rapidly using the decoded chunks of common video data 212b, allowing the video receiver to "catch up" to the live-streamed content.

Figure 10:
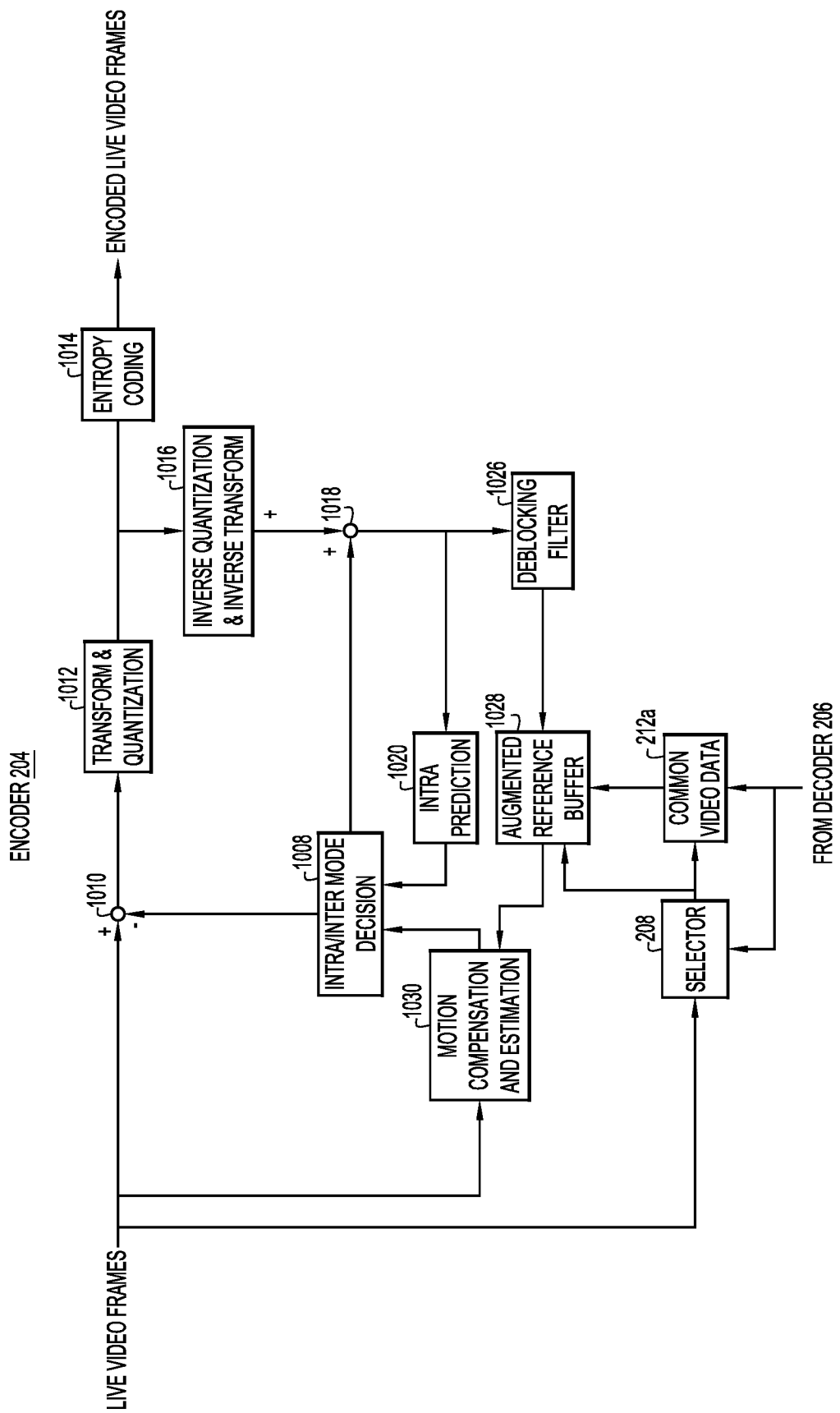
FIG. 10 is a block diagram of the encoder of the video transmitter, according to an example embodiment.

With reference to FIG. 10, there is a block diagram of low-latency video encoder 204 to encode the live video frames, according to an embodiment. Video encoder 204 includes a subtractor 1010 to receive each live video frame to be encoded, and an intra/inter mode decision module 1008 that is at the heart of the video encoder. Decision module 1008 selects intra-prediction or inter-prediction for each live video frame to be encoded, and supplies to subtractor 1010 intra-prediction video frame content or inter-prediction video frame content for the selected type of prediction, respectively. Subtractor 1010 subtracts the intra- or intra-prediction video frame content from each live video frame to produce prediction differences. Video encoder 204 includes a transform/quantizer module 1012 followed by a coder 1014 that together transform the prediction differences into the encoded live video frames.

Video encoder 204 includes an intra-prediction feedback loop to generate the intra-prediction video frame content supplied to subtractor 1010 via decision module 1008. The inter-prediction feedback loop includes transform/quantizer module 1012, an inverse quantizer/inverse transform module 1016, an adder 1018 that adds content provided by the decision module to results output by the inverse quantizer/inverse transform module, and an intra-prediction reference buffer 1020. Modules 1012, 1016, and 1018 process the prediction differences from subtractor 1010 in the order depicted in FIG. 10 to generate the intra-prediction video frame content, and then store that content in intra-prediction reference buffer 1020 so as to be accessible to decision module 1008.

Video encoder 204 also includes an inter-prediction feedback loop including transform/quantizer module 1012, inverse quantizer/inverse transform module 1016, adder 1018, a deblocking filter 1026, an augmented reference buffer 1028, and a motion compensator and estimator 1030. Modules 1012, 1016, 1018, and 1026 process the prediction differences in the order shown in FIG. 10 to generate the inter-prediction video frame content across multiple live video frames that are motion uncompensated. Deblocking filter 1026 stores the uncompensated content in augmented reference frame buffer 1028 for use in inter-prediction via decision module 1008, after that uncompensated content has been processed through motion compensator and estimator 1030.

Additionally, under control of selector 208 (shown incorporated in encoder 204 in the example of FIG. 10), augmented reference buffer 1028 receives and stores common video frames of common video data 212a as provided from video decoder 206, which may also be used in the inter-prediction via decision module 1008. For example, selector 208 selects common video frames of common video data 212a suitable for encoding/predicting the live video frames as described above in connection with FIGS. 2-4, and causes the selected common video frames to be stored to augmented reference buffer 1028 for subsequent use in inter-prediction.

Encoder 204 also generates the metadata described above and associates the metadata with the encoded live video frames output by the encoder.

Figure 11:
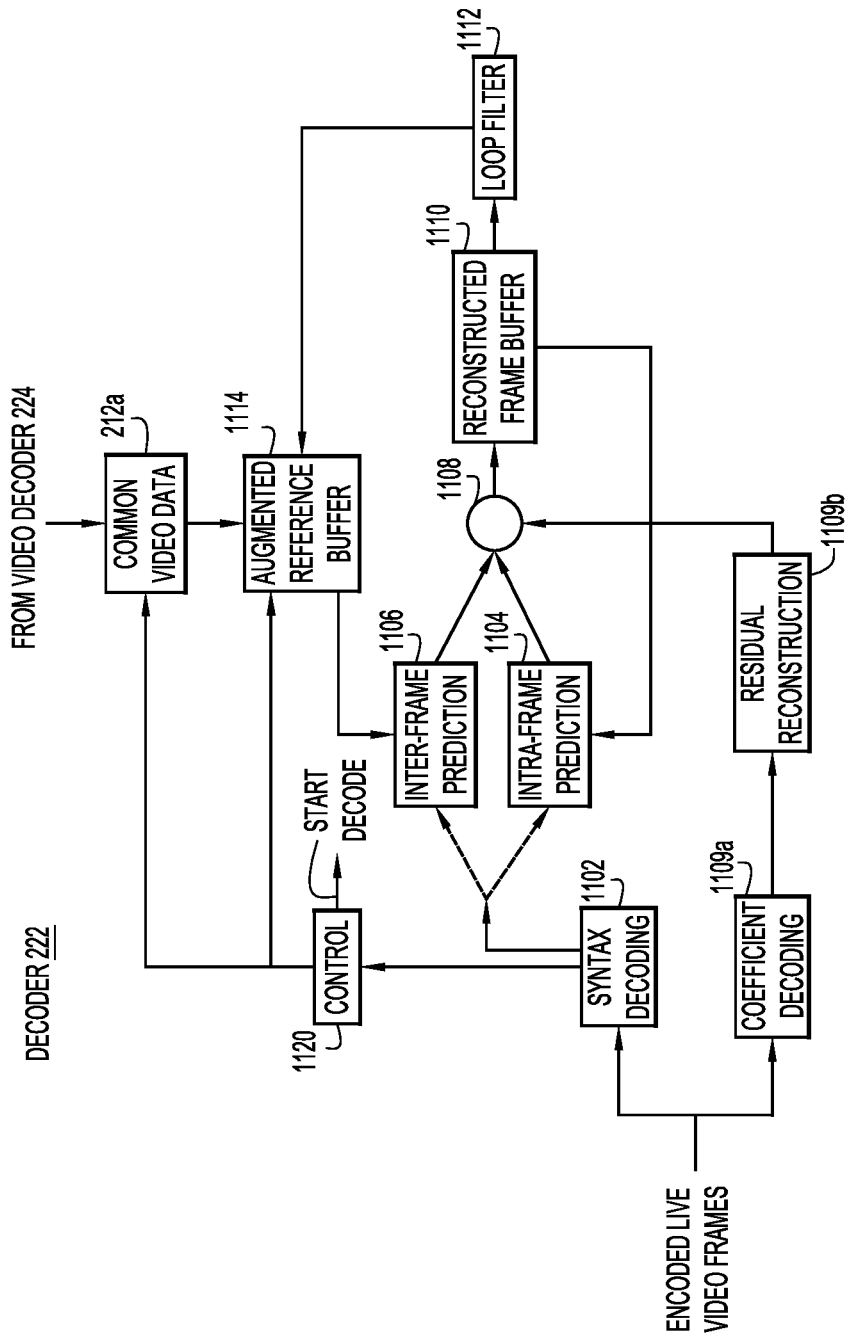
FIG. 11 is a block diagram of a video decoder of the video receiver, according to an example embodiment.

With reference to FIG. 11, there is a block diagram of video decoder 222, according to an embodiment. Video decoder 222 receives encoded live video frames and reconstructs the live video frames encoded therein. Generally, video decoder 222 operates to reconstruct prediction residuals (i.e., difference signals), add the reconstructed prediction residuals into a feedback prediction video frame, to produce a current reconstructed live video, and store the current reconstructed live video frame to a reference buffer for used in future predictions, as described further below.

A syntax decoder 1102 parses/decodes the metadata sent with the encoded live video frames. From the metadata, syntax decoder 1102 determines whether each received encoded live video frame was encoded using inter-frame prediction or intra-frame prediction. Based on the indications, syntax decoder 1102 selects either an intra-frame prediction path 1104 or an inter-frame prediction path 1106 that provide intra-frame prediction content or inter-frame prediction content to an adder 1108, respectively.

In parallel with operations performed by syntax decoder 1102, a coefficient decoder 1109*a* followed by a residual constructor 1109*b* collectively process the (received) encoded live video frame to construct prediction residuals (i.e., the difference signals), and provide the prediction residuals to adder 1108. Adder 1108 adds the prediction residuals to the intra-frame or the inter-frame prediction content to produce a reconstructed video frame, and stores that result to a reconstructed frame buffer 1110.

Video decoder 222 includes an intra-prediction feedback loop that provides the reconstructed video frame back to adder 1108 through intra-frame prediction path 1104, if the intra-frame prediction path is so configured.

Video decoder 222 also includes an inter-prediction feedback loop including reconstructed frame buffer 1110, a loop filter 1112, and an augmented reference buffer 1114. Reconstructed frame buffer 1110 and loop filter 1112 generate inter-frame prediction content (e.g., video frame content) across multiple reconstructed live video frames, and store that content in augmented reference buffer 1114 for use in inter-prediction via inter-frame prediction path 1106, if so configured.

Additionally, under control of syntax decoder 1102 and a control module 1120, augmented reference buffer 1114 stores indicated ones of common video frames as provided from video decoder 206, which then may also be used for the inter-prediction via inter-frame prediction path 1106. In one example, syntax decoder 1102/control module 1120 identify common video frames used to encode a given encoded live video frame (based on the identifiers of those common video frames in the encoded live video frame metadata) and then cause the identified common video frames to be stored to augmented reference buffer 1114 for subsequent use in inter-prediction.

In another example, control module 1120 may search for an access point in the encoded live video frames based on prediction dependencies therein provided from syntax decoder 1102. For example, control module 1120 searches for a break in dependencies to prior live video frames (prior to the access point). When an access point is found, control module 1120 may cause common video frames corresponding to the access point to be loaded into augmented reference buffer 1114 for use in inter-prediction.

Figure 12:
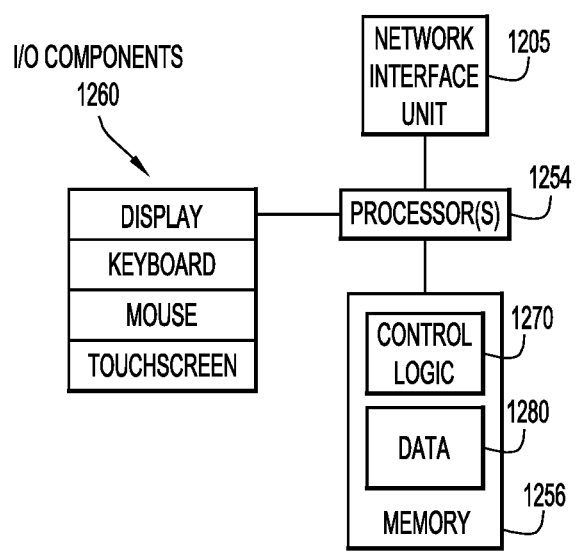
FIG. 12 is a block diagram of an endpoint device that may server as the video transmitter and/or video receiver, according to an example embodiment.

With reference to FIG. 12, there is a block diagram of an example endpoint device 1200 representative of any of endpoint devices 102(1)-102(3). Endpoint device 1200 includes a network interface unit (NIU) 1205 to communicate with a network, a processor 1254 (or multiple processors), and memory 1256. NIU 1205 enables endpoint device 1200 to communicate over wired connections or wirelessly with a network. NIU 1205 may include, for example, an Ethernet card or other interface device having a connection port that enables endpoint device 1200 to communicate over the network via the connection port. In a wireless embodiment, NIU 1205 includes a wireless transceiver and an antenna to transmit and receive wireless communication signals to and from the network. The memory 1256 stores instructions for implementing server methods or client device methods described herein. Computer device 1200 also includes input/output (I/O) components 1260 connected with processor 1254 including a display for displaying information, and input components, such as a keyboard, mouse, touchscreen, and the like, through which a user may enter information into the computer device.

The memory 1256 may comprise read only memory (ROM), random access memory (RAM), magnetic disk storage media devices, optical storage media devices, flash memory devices, electrical, optical, or other physical/tangible (non-transitory) memory storage devices. The processor 1254 is, for example, a microprocessor or a microcontroller that executes instructions stored in memory. Thus, in general, the memory 1256 may comprise one or more tangible computer readable storage media (e.g., a memory device) encoded with software comprising computer executable instructions and when the software is executed (by the processor 1254) it is operable to perform the operations described herein. Memory 1256 stores control logic 1270 to perform the methods described herein for a video transmitter and a video receiver, including methods 300, 400, 800, and 900. Control logic 1270 includes logic for video encoder 204, selector 208, video decoder 206, video decoder 222, and video decoder 224.

The memory may also store data 1280 used and generated by control logic 1270 as described herein. Data 1280 may include common video data 212*a* and encoded common video data 212*b*, as well as encoded live video frames.

Video transmitter 102(1) begins to transmit the encoded live video frames to video receiver 102(3) in addition to video receiver 102(1).

In summary, in one form, a method is provided comprising: at a first endpoint device having access to common video data including common video frames and encoded common video data having the common video frames encoded therein: downloading to a second endpoint device the encoded common video data; after, or during, the downloading of the encoded common video data, playing live video frames in a play order; encoding the live video frames in the play order into encoded live video frames, wherein the encoding includes, for each live video frame, predicting the live video frame based on a previous live video frame that has been encoded and a common video frame from the common video data that has been downloaded in the encoded common video data; and transmitting to the second endpoint device the encoded live video frames including indications of the previous live video frame and the common video frame used to encode each encoded live video frame.

In another form, an apparatus is provided comprising: a network interface unit configured to communicate with a network; a processor coupled to the network interface unit and configured to, on behalf of a first endpoint device: access common video data including common video frames, and access encoded common video data having the common video frames encoded therein: download to a second endpoint device the encoded common video data; after, or during, the downloading of the encoded common video data, play live video frames in a play order; encode the live video frames in the play order into encoded live video frames, wherein, to encode, the processor is configured to, for each live video frame, predict the live video frame based on a previous live video frame that has been encoded and a common video frame from the common video data that has been downloaded in the encoded common video data; and transmit to the second endpoint device the encoded live video frames including indications of the previous live video frame and the common video frame used to encode each encoded live video frame.

In yet another form, a processor readable medium is provided to store instructions that, when executed by a processor, cause the processor to: access common video data including common video frames, and access encoded common video data having the common video frames encoded therein; download to a second endpoint device the encoded common video data; after, or during, the downloading of the encoded common video data, play live video frames in a play order; encode the live video frames in the play order into encoded live video frames, wherein the instructions to cause the processor to encode include instructions to cause the processor to, for each live video frame, predict the live video frame based on a previous live video frame that has been encoded and a common video frame from the common video data that has been downloaded in the encoded common video data; and transmit to the second endpoint device the encoded live video frames including indications of the previous live video frame and the common video frame used to encode each encoded live video frame.

The above description is intended by way of example only. Various modifications and structural changes may be made therein without departing from the scope of the concepts described herein and within the scope and range of equivalents of the claims.

What is claimed is:

1. A method comprising:
   at a first endpoint device having access to common video data and encoded common video data stored in a memory, the common video data including common video frames and the encoded common video data having the common video frames encoded therein:
   downloading to a second endpoint device the encoded common video data;
   after, or during, the downloading of the encoded common video data to the second endpoint device, playing in real-time content accessed from the common video data to produce live video frames in a play order;
   encoding in real-time the live video frames in the play order into encoded live video frames, wherein the encoding includes, for each live video frame:
      comparing the live video frame to the common video frames in the common video data and, based on results of the comparing, selecting from the common video data a common video frame that has already been downloaded in the encoded common video data, such that the common video frame is the same as or substantially similar in that it provides a real-time playout of some or all of common video data to the live video frame; and
      predicting the live video frame based on the common video frame, to produce prediction residuals that are reduced compared to predicting without using the common video frame and using only a previous live video frame that is substantially different in that it results in a sudden large increase in an amount of prediction data from the live video frame; and
   transmitting to the second endpoint device the encoded live video frames including indications of the common video frame used to encode each encoded live video frame, and the prediction residuals.

2. The method of claim 1, wherein the encoding includes encoding in accordance with a Moving Picture Experts Group (MPEG) standard, an H.264/Advance Video Coding (AVC) standard, or an H.265/High Efficiency Video Encoding (HEVC) standard.

3. The method of claim 1, wherein the comparing includes using a video comparing technique to search through the common video data for one of the common video frames having video content most similar to video content of the live video frame, and the selecting includes selecting the common video frame based on the searching.

4. The method of claim 1, wherein the play order of the live video frames is different from an order of the common video frames in the common video data.

5. The method of claim 1, further comprising, at the first endpoint device:
   receiving the encoded common video data; and
   decoding the received encoded common video data to produce the common video data.

6. The method of claim 1, wherein the downloading includes downloading the encoded common video data to the second endpoint device over a first channel and streaming the encoded live video frames to the second endpoint device over a second channel.

7. The method of claim 1, wherein:
   the common video data includes identifiers of the common video frames; and
   the encoded common video data includes the identifiers of the common video frames encoded therein.

8. The method of claim 1, wherein:
   the encoded common video data includes a sequence of independently encoded chunks of the common video frames; and
   the downloading includes downloading the independently encoded chunks of the common video frames in sequence.

9. The method of claim 1, further comprising: receiving from a third endpoint device a request to receive the encoded live video frames, and in response:
   identifying a current live video frame to be encoded as a decoding access point,
   wherein the encoding further includes predicting the current live video frame and subsequent live video frames without reference to any live video frame previous to the current live video frame.

10. The method of claim 9, further comprising:
   after identifying the current live video frame, locating common video frames in the common video data that correspond to the current live video frame, and downloading to the third endpoint device the encoded common video data beginning with the located common video frames encoded therein,
   wherein the encoding the current live video frame and subsequent live video frames includes, after the located common video frames have been downloaded, predicting at least some of the current live video frame and the subsequent live video frames only with reference to current live video frames that do not occur before the live video frame and with reference to common video frames from the common video data.

11. The method of claim 1, further comprising, at the second endpoint device:
   receiving the encoded common video data;
   decoding the received encoded common video data to recover the common video frames therein;
   receiving the encoded live video frames and the indications; and decoding each encoded live video frame based on previously decoded ones of the common video frames in the common video data as identified by the indications.

12. An apparatus comprising:
a network interface unit configured to communicate with a network;
a processor coupled to the network interface unit and configured to, on behalf of a first endpoint device:
access common video data and encoded common video data stored in a memory, the common video data including common video frames and the encoded common video data having the common video frames encoded therein;
download the encoded common video data to a second endpoint device;
after, or during, the downloading of the encoded common video data, play in real-time content accessed from the common video data to produce live video frames in a play order;
encode in real-time the live video frames in the play order into encoded live video frames, wherein, to encode, the processor is configured to, for each live video frame:
compare the live video frame to the common video frames in the common video data and, based on results of the compare, select from the common video data a common video frame that has already been downloaded in the encoded common video data, such that the common video frame is the same as or substantially similar in that it provides a real-time playout of some or all of common video data to the live video frame;
and predict the live video frame based on the common video frame, to produce prediction residuals that are reduced compared to predicting without using the common video frame and using only a previous live video frame that is substantially different in that it results in a sudden large increase in an amount of prediction data from the live video frame;
and transmit to the second endpoint device the encoded live video frames including indications of the common video frame used to encode each encoded live video frame, and the prediction residuals.

13. The method of claim 1, wherein the common video frame used in the encoding is a video frame that has not been played by the playing.

14. The apparatus of claim 12, wherein the processor is further configured to encode by encoding in accordance with a Moving Picture Experts Group (MPEG) standard, an H.264/Advance Video Coding (AVC) standard, or an H.265/High Efficiency Video Encoding (HEVC) standard.

15. The apparatus of claim 12, wherein the processor is configured to compare by using a video comparing technique to search through the common video data for one of the common video frames having video content most similar to video content of the live video frame, and the processor is configured to select by selecting the common video frame based on the search.

16. The apparatus of claim 12, wherein:
the common video data includes identifiers of the common video frames; and
the encoded common video data includes the identifiers of the common video frames encoded therein.

17. A non-transitory computer readable medium encoded with instructions that, when executed by a processor of a first endpoint device, cause the processor to:
access common video data and encoded common video data stored in a memory, the common video data including common video frames and the encoded common video data having the common video frames encoded therein;
download the encoded common video data to a second endpoint device;
after, or during, the downloading of the encoded common video data, play in real-time content accessed from the common video data to produce live video frames in a play order;
encode in real-time the live video frames in the play order into encoded live video frames, wherein the instructions to cause the processor to encode include instructions to cause the processor to, for each live video frame:
compare the live video frame to the common video frames in the common video data and, based on results of the compare, select from the common video data a common video frame that has already been downloaded in the encoded common video data, such that the common video frame is the same as or substantially similar in that it provides a real-time playout of some or all of common video data to the live video frame;
and predict the live video frame based on the common video frame, to produce prediction residuals that are reduced compared to predicting without using the common video frame and using only a previous live video frame that is substantially different in that it results in a sudden large increase in an amount of prediction data from the live video frame;
and transmit to the second endpoint device the encoded live video frames including indications of the common video frame used to encode each encoded live video frame, and the prediction residuals.

18. The non-transitory computer readable medium of claim 17, wherein the instructions to cause the processor to encode include instructions to cause the processor to encode in accordance with a Moving Picture Experts Group (MPEG) standard, an H.264/Advance Video Coding (AVC) standard, or an H.265/High Efficiency Video Encoding (HEVC) standard.

19. The non-transitory computer readable medium of claim 17, wherein the instructions to cause the processor to compare include instructions to cause the processor to compare using a video comparing technique to search through the common video data for one of the common video frames having video content most similar to video content of the live video frame, and selecting the instructions to cause the processor to select include instructions to cause the processor to select the common video frame based on the search.

20. The non-transitory computer readable medium of claim 17, wherein:
the common video data includes identifiers the common video frames;
and the encoded common video data includes the identifiers of the common video frames encoded therein.

* * * * *